United States Patent [19]
Tanaka et al.

[11] Patent Number: 6,130,420
[45] Date of Patent: Oct. 10, 2000

[54] SOLID STATE IMAGE SENSING APPARATUS, CAMERA USING THE APPARATUS, AND METHOD FOR DRIVING THE APPARATUS

[75] Inventors: Akihisa Tanaka; Shinichiro Saito, both of Kanagawa, Japan

[73] Assignee: Sony Corporation, Tokyo, Japan

[21] Appl. No.: 09/066,848

[22] Filed: Apr. 28, 1998

[30] Foreign Application Priority Data

Apr. 30, 1997 [JP] Japan ..................................... 9-112133

[51] Int. Cl.$^7$ ..................................................... H01L 27/00
[52] U.S. Cl. ........................ 250/208.1; 348/220; 348/302
[58] Field of Search ........................ 250/208.1; 348/222, 348/220, 302, 230; 358/909.1; 386/46

[56] References Cited

U.S. PATENT DOCUMENTS 5,539,455  7/1996  Makioka .................................. 348/222
5,828,406  10/1998 Parulski et al. .......................... 348/220
5,909,247  6/1999  Hosokai et al. ......................... 348/302

*Primary Examiner*—Que T. Le
*Assistant Examiner*—Thanh X. Luu
*Attorney, Agent, or Firm*—Hill & Simpson

[57] ABSTRACT

A solid state image sensing apparatus comprising: a solid state image sensing device operated selectively either in an all-pixel read-out mode in which signal charges of all pixels represented by the devices are read therefrom individually at the same time, or in a thinned read-out mode in which the signal charges are read only from part of vertical pixel columns formed by the devices; and a frequency varying unit for varying a driving frequency of the solid state image sensing device depending on the operating mode in effect. When used illustratively in a camera, the inventive apparatus reduces power dissipation without affecting the number of pictures output per unit time.

6 Claims, 7 Drawing Sheets

ALL-PIXEL READ-OUT MODE

THINNED READ-OUT MODE

SOLID STATE IMAGE SENSING APPARATUS, CAMERA USING THE APPARATUS, AND METHOD FOR DRIVING THE APPARATUS

BACKGROUND OF THE INVENTION

The present invention relates to a solid state image sensing apparatus and a method for driving the apparatus, more particularly to a solid state image sensing apparatus for use by an electronic still camera and a method for driving the apparatus incorporated in the camera. The invention further relates to cameras such as electronic still cameras comprising a solid state image sensing apparatus each.

Along with the development in recent years of CCD (charge coupled devices) for image sensing and other solid state image sensing apparatuses has come widespread use of electronic still cameras. These cameras record images digitally using CCD-equipped solid state image sensing apparatuses as their image sensors.

To achieve high levels of resolution, electronic still cameras usually employ a so-called all-pixel read-out type CCD-equipped solid state image sensing apparatus. In operation, signal charges of the pixels represented by each vertical CCD column are read out independently of one another at the same time, as shown in FIG. 9. Given the same number of pixels, the all-pixel read-out type CCD-equipped solid state image sensing apparatus doubles the vertical resolution of the so-called field read-out type solid state image sensing apparatus used generally by video cameras.

There has recently been a demand for reducing power dissipation of these electronic still cameras so that they may be operated for an extended period of time. One way of achieving that target is to reduce power dissipation by the solid state image sensing apparatus of the electronic still camera, especially by a solid state image sensing device constituting the solid state image sensing apparatus and by a signal processing circuit for processing signals from these components.

Power consumption of a solid state image sensing device depends significantly on their driving frequency. This signifies that lowering the driving frequency of the solid state image sensing device effectively reduces the amount of power consumed thereby. Since the driving frequency is also used as the frequency of the signal processing circuit, reductions in the driving frequency are expected to reduce the amount of power dissipation by the signal processing circuit as well.

There is a disadvantage in lowering the driving frequency of the solid state image sensing device: it also lowers their frame rate. A lowered frame rate reduces the amount of output signals (i.e., number of pictures) output by the solid state image sensing device per unit time. This translates into awkward and unnatural motions of pictures shown on a display unit (typically an LCD) of the electronic still camera for the purpose of verifying the composition of a subject. Another disadvantage is increased vulnerability of the solid state image sensing device to adverse effects of dark currents and smears.

SUMMARY OF THE INVENTION

It is therefore an object of the present invention to provide a solid state image sensing apparatus and a method for driving the apparatus whereby power dissipation is reduced without affecting the number of pictures output by a solid state image sensing device constituting the apparatus.

It is another object of the present invention to provide a camera utilizing a solid state image sensing apparatus wherein power dissipation of the apparatus is reduced without affecting picture motions on a monitor display or the quality of picked-up images.

In carrying out the invention and according to one aspect thereof, there is provided a solid state image sensing apparatus comprising: a solid state image sensing device operated selectively either in an all-pixel read-out mode in which signal charges of all pixels represented by the devices are read therefrom individually at the same time, or in a thinned read-out mode in which the signal charges are read only from part of vertical pixel columns formed by the devices; and a frequency varying unit for varying a driving frequency of the solid state image sensing device depending on the operating mode in effect.

According to another aspect of the invention, there is provided a method for driving a solid state image sensing apparatus having a solid state image sensing device operated selectively either in an all-pixel read-out mode in which signal charges of all pixels represented by the devices are read therefrom individually at the same time, or in a thinned read-out mode in which the signal charges are read only from part of vertical pixel columns formed by the devices. The method comprises the step of making lower the driving frequency of the solid state image sensing device in the thinned read-out mode in which the signal charges are read partially from the devices, than the driving frequency of the solid state image sensing device in the all-pixel read-out mode.

The solid state image sensing apparatus and the method driving the apparatus as outlined above vary the driving frequency of the solid state image sensing device depending on the operating mode in effect. This makes it possible illustratively to make the driving frequency of the solid state image sensing device in the thinned read-out mode lower than the driving frequency in the all-pixel read-out mode. Because signal charges are read from only part of vertical pixel columns formed by the devices in the thinned read-out mode, lowering the driving frequency does not reduce the number of pictures output by the devices per unit time. A lowered driving frequency contributes to reducing power consumption by the solid state image sensing device.

According to a further aspect of the invention, there is provided a camera comprising: an optical lens for forming a two-dimensional optical image of a subject; a solid state image sensing apparatus for photoelectrically converting the image formed by the optical lens into electrical signals; a storage unit for storing the electrical signals obtained as picked-up image data through the photoelectric conversion by the solid state image sensing apparatus; and a display unit for displaying, upon storage of the picked-up image data into the storage unit, the electrical signals in the form of a visible image for the purpose of verifying composition of the subject; wherein the solid state image sensing apparatus includes: a solid state image sensing device operated selectively either in an all-pixel read-out mode in which signal charges of all pixels represented by the devices are read therefrom individually at the same time, or in a thinned read-out mode in which the signal charges are read only from part of vertical pixel columns formed by the devices; and a frequency varying unit for varying a driving frequency of the solid state image sensing device depending on the operating mode in effect.

According to the camera of the above constitution, its solid state image sensing apparatus varies the driving frequency of the component solid state image sensing device depending on the operating mode in effect. This makes it possible for the camera illustratively to make the driving frequency of the solid state image sensing device in the thinned read-out mode lower than in the all-pixel read-out mode. Because signal charges are read from only part of vertical pixel columns formed by the devices in the thinned read-out mode, lowering the driving frequency does not reduce the number of pictures output by the devices per unit time. This averts awkward and unnatural motions of pictures shown on the display unit for the purpose of verifying the composition of a subject. Furthermore, a lowered driving frequency contributes to reducing power consumption by the solid state image sensing device. In the all-pixel read-out mode, the driving frequency of the solid state image sensing device is kept from getting lowered. This prevents deterioration of picked-up image data as they are stored into the storage unit.

Other objects, features and advantages of the invention will become more apparent upon a reading of the following description and appended drawings.

DESCRIPTION OF THE PREFERRED EMBODIMENTS

Figure 1:
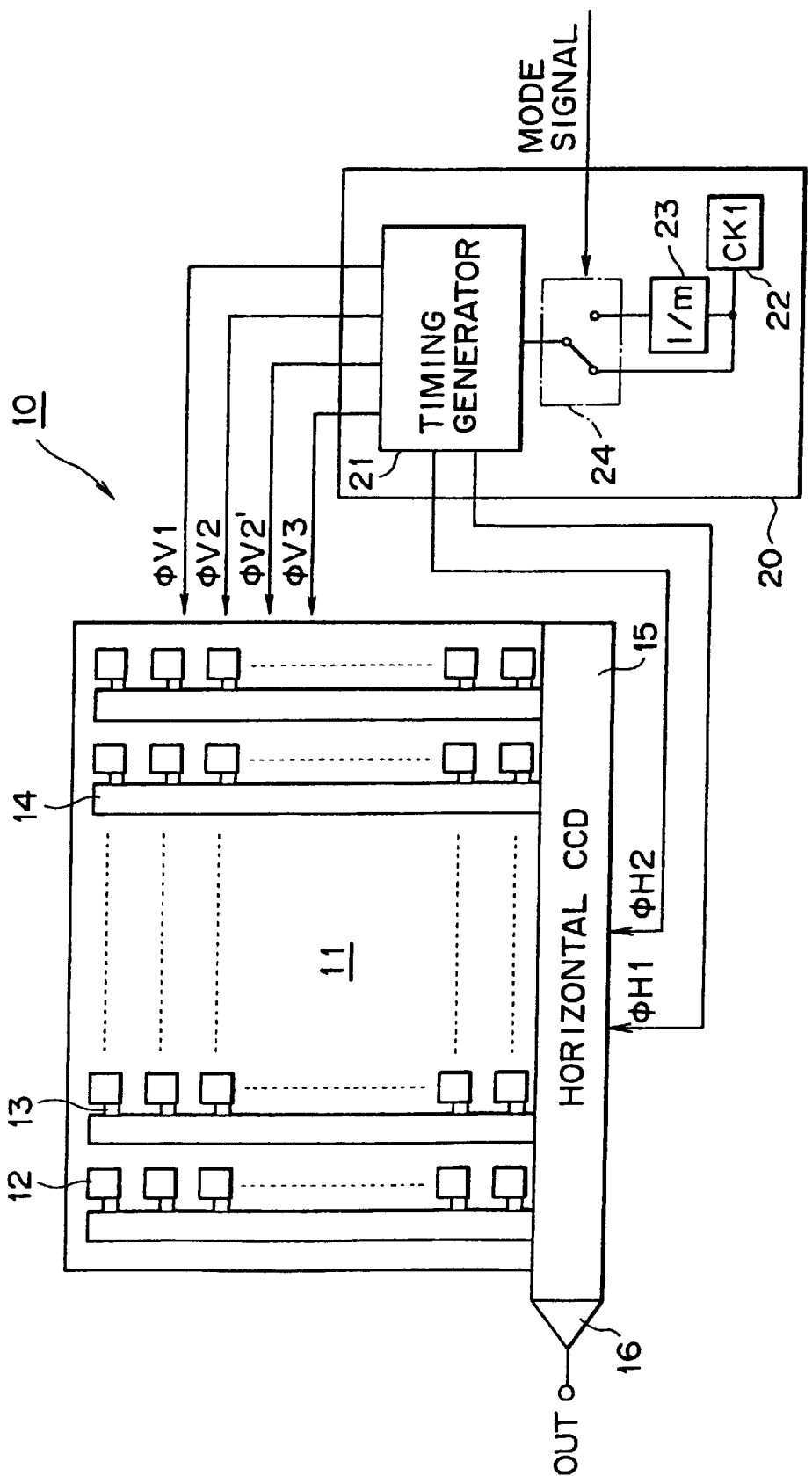
FIG. 1 is a schematic block diagram of a solid state image sensing apparatus practiced as an embodiment of the invention.

Preferred embodiments of this invention will now be described in detail with reference to the accompanying drawings. FIG. 1 is a schematic block diagram of a CCD-equipped solid state image sensing apparatus practiced as one preferred embodiment of the invention. As shown in FIG. 1, the embodiment comprises a CCD solid state image sensing device 10 and a timing generating circuit 20.

A CCD solid state image sensing device 10 includes an image pickup area 11. The image pickup area 11 is made up of a plurality of sensors 12 and a plurality of vertical CCDS 14. The sensors 12 are arranged in the row direction (horizontally) and column direction (vertically) to form a matrix pattern, each sensor accumulating an electrical signal charge reflecting the quantity of incident light that has been converted by the sensor in question. Each vertical CCD is furnished corresponding to each vertical column of sensors 12, the CCD transferring vertically the signal charges read from the sensors 12 on the column through read-out gates 13.

In the image pickup area 11, the sensors 12 are each formed by a PN junction photodiode. The signal charges accumulated in the sensors 12 are read out to each vertical CCD 14 when a read-out pulse XSG, to be discussed later, is applied to read-out gates 13 corresponding to the sensors. The vertical CCDs 14 constitute illustratively a three-phase driven type ($\phi$V1–$\phi$V3) three-layer electrode structure each. The signal charges read from the sensors 12 are transferred in a vertically successive manner, in increments each representing one scanning line during part of a horizontal blanking period.

For each vertical CCD 14, the second-layer ($\phi$V2) transfer electrode doubles as a gate electrode for the read-out gates 13. That is, of the three-phase vertical transfer clock signals $\phi$V1 through $\phi$V3, the second-phase vertical transfer clock signal $\phi$V2 takes one of three values: low, medium, or high level. A pulse at the high level is used as a read-out pulse XSG that is applied to the read-out gates 13.

A horizontal CCD 15 is located under the image pickup area 11 (as seen in FIG. 1). The horizontal CCD 15 receives signal charges in increments each representing one scanning line transferred from a plurality of vertical CCDs 14. The horizontal CCDs 15 constitute illustratively a two-phase driven type ($\phi$H1, $\phi$H2) two-layer electrode structure each. The signal charges in increments representing one line each from a plurality of vertical CCDs are transferred in a horizontally successive manner during a horizontal scanning period following a horizontal blanking period.

At one end of each horizontal CCD 15, there is provided a charge-to-voltage converter 16 illustratively composed of a floating diffusion amplifier. The charge-to-voltage converter 16 successively converts to a voltage signal the signal charges transferred horizontally by the horizontal CCD 15 in question and outputs thus converted voltage signal. The voltage signal is output as an OUT signal of the CCD reflecting the quantity of incident light from a subject. The components above make up the CCD solid state image sensing device 10.

The timing generating circuit 20 generates various timing signals including the vertical transfer clock signals $\phi$V1 through $\phi$V3 and horizontal transfer clock signals $\phi$H1 and $\phi$H2 for driving the CCD solid state image sensing device 10 of the above-described constitution. The timing generating circuit 20 comprises a reference oscillator 22, a divider 23 and a selector 24 in addition to a timing generator 21 that generates diverse timing signals.

In accordance with an externally supplied mode signal, the timing generator 21 operates in one of two modes: an all-pixel read-out mode in which signal charges of all pixels are read out individually at the same time, and a thinned read-out mode in which signal charges are read only from part of vertical pixel columns. The two modes are addressed by the second-phase vertical transfer clock pulse $\phi$V2 generated in the form of two clock signals ($\phi$V2, $\phi$V2').

The reference oscillator 22 oscillates reference pulses of a predetermined frequency. The divider 23 divides the reference pulses oscillated by the reference oscillator 22 by a factor of m (1/m, where m is a natural number). The selector 24 permits changeover between two choices: either the reference pulses as oscillated by the reference oscillator 22 are selected and fed to the timing generator 21, or the divided pulse signal from the divider 23 is selected and sent to the timing generator 21. The switching action is carried out in accordance with the operating mode in effect, i.e., the all-pixel read-out mode or the thinned read-out mode.

Figure 2:
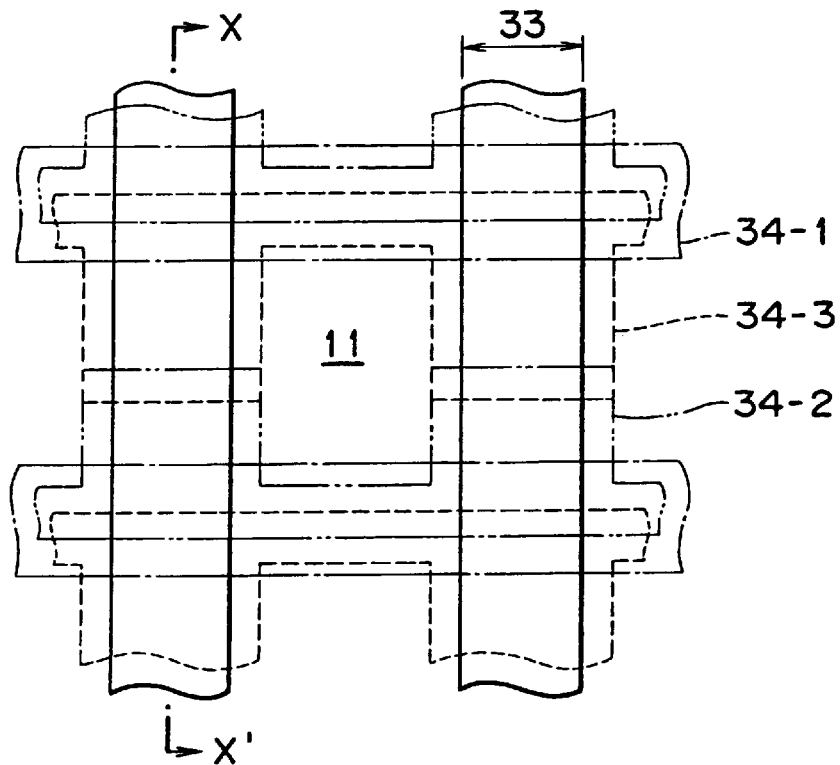
FIG. 2 is a plan pattern view of a typical pixel constitution.
Figure 3:
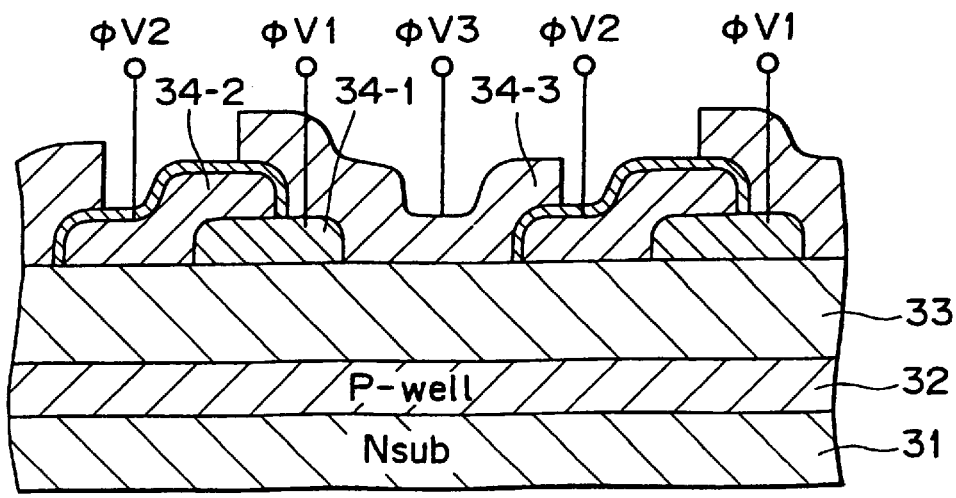
FIG. 3 is a cross-sectional view taken on line X–X' in FIG. 2.

FIG. 2 is a plan pattern view of a typical pixel constitution, and FIG. 3 is a cross-sectional view taken on line X–X' in FIG. 2. A vertical CCD 14 is made up of a transfer channel 33 and three-phase transfer electrodes 34-1 through 34-3. The transfer channel 33 containing N-type impurities is formed on an N-type substrate 31 with a P-type well 32 formed therebetween. The three-phase transfer electrodes 34-1 through 34-3 are arranged repeatedly above the transfer channel 33 in the transfer direction thereof. of the transfer electrodes 34-1 through 34-3, the first-phase transfer electrode 34-1 is formed by first-layer polysilicon (indicated by dashed line in FIG. 2), the second-phase transfer electrode 34-2 by second-layer polysilicon (denoted by two-dot chain line), and the third-phase transfer electrode 34-3 by third-layer polysilicon (delimited by broken line).

Figure 4:
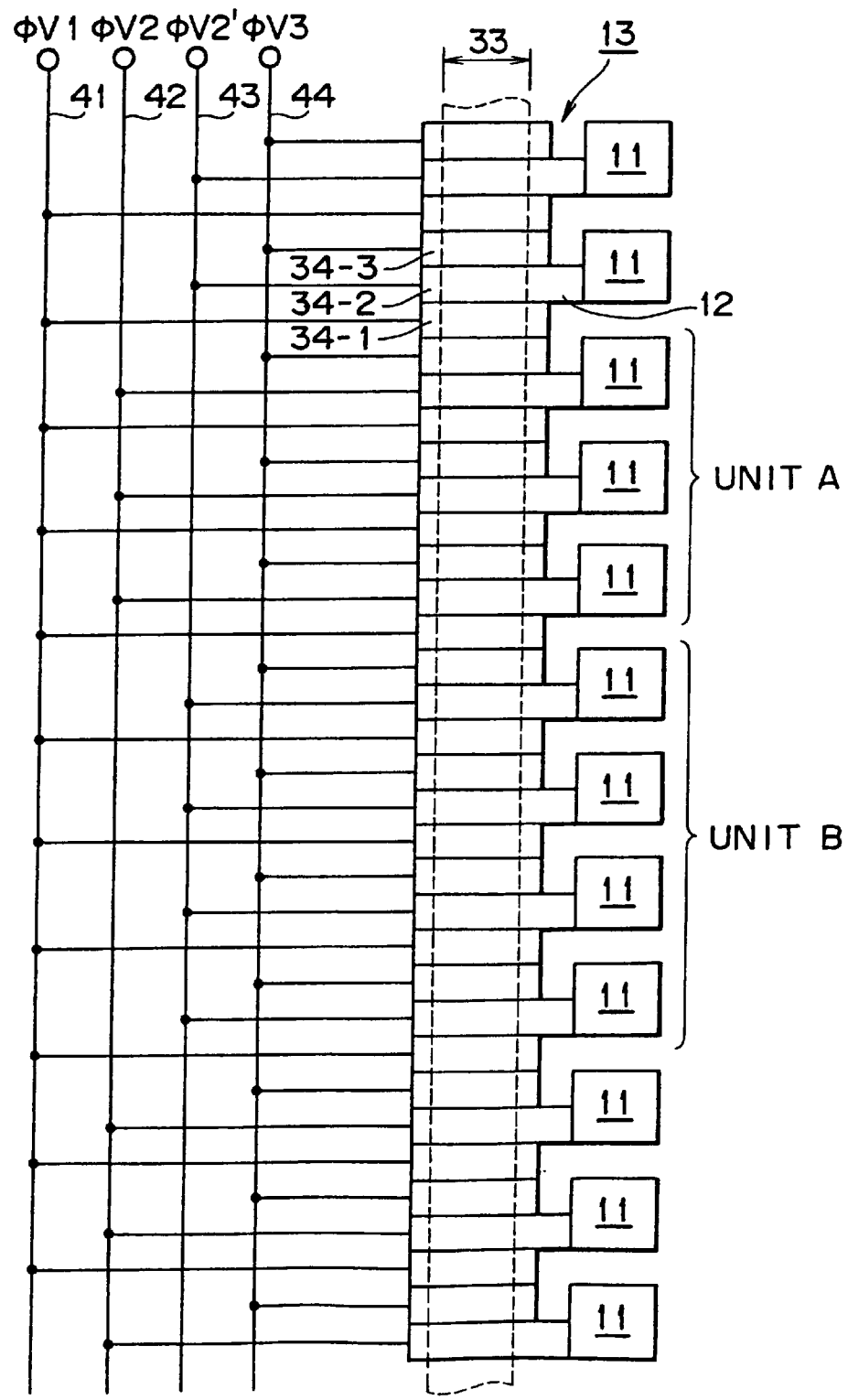
FIG. 4 is a wiring pattern diagram of a vertical CCD.
Figure 5:
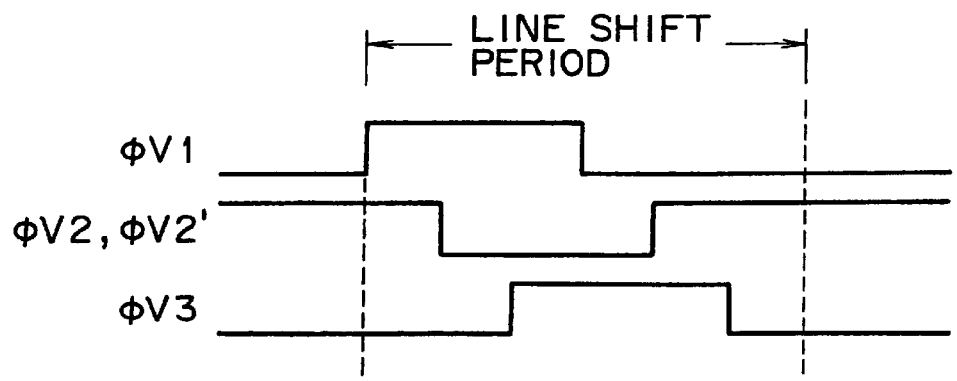
FIG. 5 is a timing chart showing phase relations between three-phase vertical transfer clock signals.

FIG. 4 is a wiring pattern diagram of the transfer electrodes 34-1 through 34-3 in a vertical CCD. In this wiring layout, the wiring for the second-phase vertical transfer clock signal φV2 is so contrived as to enable thinned read-out driving. Specifically, as discribed above, the second-phase vertical transfer clock is provided in the form of two vertical transfer clock signals φV2 and φV2'. In addition, four bus lines 41 through 44 are furnished to transmit the vertical transfer clock signals φV1, φV2, φV2'and φV3. FIG. 5 is a timing chart showing phase relations between the vertical transfer clock signals φV1, φV2, φV2'and φV3 during a line shift period.

The bus lines 41 and 44 for transmitting the vertical transfer clock signals φV1 and φV3 are connected to the first-phase transfer electrodes 34-1 and 34-3 of all pixels. The bus line 42 for transmitting the vertical transfer clock signal φV2 is connected to units A each made of three contiguous pixels and arranged four pixels apart, each unit A having its second-phase transfer electrode 34-2 linked to the bus line 42. The bus line 43 for transmitting the vertical transfer clock signal φV2'is connected to units B each made of four contiguous pixels other than those connected to the bus line 42 and arranged three pixels apart, each unit B having its second-phase transfer electrode 34-3 linked to the bus line 43.

Figure 6A:
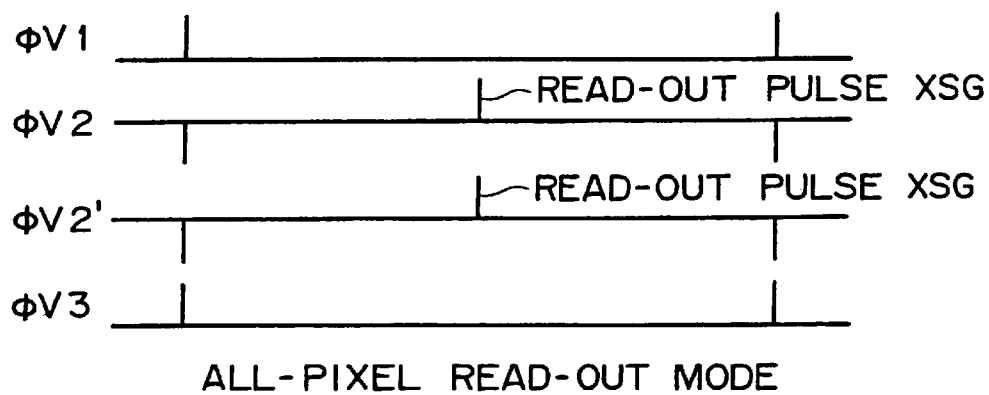
FIGS. 6A and 6B are timing charts for explaining a read-out pulse XSG, FIG. 6A showing the case of the all-pixel read-out mode, FIG. 6B depicting the case of the thinned read-out mode.
Figure 6B:
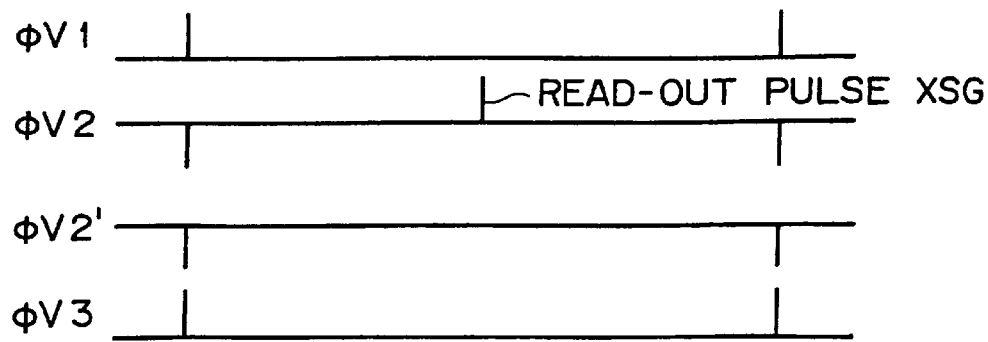

In the vertical transfer clock signals φV2 and φV2', as mentioned above, the third high-level pulse constitutes a read-out pulse XSG that is applied to the gate electrodes of the gates 13 when signal charges are to be read from the sensors 12. In the all-pixel read-out mode, the read-out pulse XSG occurs in the two vertical transfer clock signals φV2 and φV2'as shown in FIG. 6A. In the thinned read-out mode, the read-out pulse XSG appears in the vertical transfer clock signal φV2 alone as shown in FIG. 6B.

In the all-pixel read-out mode, the appearance of the read-out pulse XSG in the two vertical transfer clock signals φV2 and φV2'allows the signal charges to be read from all pixels. In the thinned read-out mode, the occurrence of the read-out pulse XSG in the vertical transfer clock signal φV2 alone causes the signal charges to be read out three lines at a time and four lines apart. In other words, the signal charges are thinned out four lines at a time and three lines apart.

This embodiment was shown having a color CCD solid state image sensing device operated to read out signal charges three lines at a time and four lines apart in keeping with the color coding of color filters in use. However, this is not limitative of the invention. Alternatively, the signal charges may be read out four lines at a time and two lines apart, two lines at a time and one line apart or otherwise. Any of such signal charge thinning arrangements is made available by simply modifying the wiring pattern of the vertical transfer clock signals φV2 and φV2'in FIG. 4.

The timing generating circuit 20 includes the reference oscillator 22, divider 23 and selector 24 in addition to the timing generator 21 that may take either the all-pixel read-out mode or the thinned read-out mode depending on an externally supplied mode signal. In this timing generating circuit 20, the timing generator 21 is supplied either with the reference pulses as oscillated by the reference oscillator 22, or with a divided pulse signal (1/m) from the divider 23 under switching control of the selector 24. The switching is carried out in accordance with the externally supplied mode signal that is used by the timing generator 21 for mode selection.

More specifically, the selector 24 acts in such a manner that the reference pulses are supplied as oscillated to the timing generator 21 in the all-pixel read-out mode and that the divided pulse signal (1/m) is fed to the timing generator 21 in the thinned read-out mode. On the basis of the reference pulses or divided pulse signal thus supplied, the timing generator 21 generates various timing signals including the vertical transfer clock signals φV1 through φV3 and horizontal transfer clock signals φH1 and φH2 to drive the CCD solid state image sensing device 10. The timing signals generated in the thinned read-out mode have a frequency that is 1/m of the frequency for the timing signals generated in the all-pixel read-out mode. That is, the driving frequency supplied to the CCD solid state image sensing device 10 in the thinned read-out mode is 1/m of the driving frequency in the all-pixel read-out mode.

With their driving frequency reduced to 1/m of the original level, the CCD solid state image sensing device 10 also has their frame rate lowered to 1/m. At this point, the CCD solid state image sensing device 10 operate in the thinned read-out mode. This signifies that, of the n pixels (n: natural number), only one pixel is read out (1/n thinned read-out) so that the frame rate in the all-pixel read-out mode may be increased by a factor of n.

Where the driving frequency is reduced to 1/m, carrying out the 1/m thinned read-out process brings the frame rate to n/m. If n=m, then there is no change in frame rate between the all-pixel read-out mode and the thinned read-out mode. The reduction of the driving frequency to 1/m of its original level offers another benefit: the CCD solid state image sensing device 10 supplied with the reduced driving frequency consume less power than before.

As described, the CCD-based solid state image sensing apparatus of the invention and the inventive method for driving the apparatus permit varying the driving frequency fed to the CCD solid state image sensing device 10 in accordance with the operating mode in effect. This makes it possible to bring the driving frequency in the thinned read-out mode down to 1/m of the level in the all-pixel read-out mode. The reduced driving frequency lowers power dissipation of the CCD solid state image sensing device 10 without causing the frame rate to decline. That is, the power consumption of the CCD solid state image sensing device 10 is lowered without affecting the number of pictures output by the devices per unit time.

The CCD-based solid state image sensing apparatus embodying the invention varies the driving frequency using the reference oscillator 22, divider 23 and selector 24 contained in the timing generating circuit 20. That, the timing generator 21 need only be supplemented by the reference oscillator 22, divider 23 and selector 24 when the driving frequency is to be varied, whereby reductions in power dissipation are readily accomplished. A commonly marketed timing generator 21 may be used unmodified as long as it operates either in the all-pixel read-out mode or in the thinned read-out mode in keeping with an externally supplied mode signal. This facilitates the design of the timing generating circuit 20.

Figure 7:
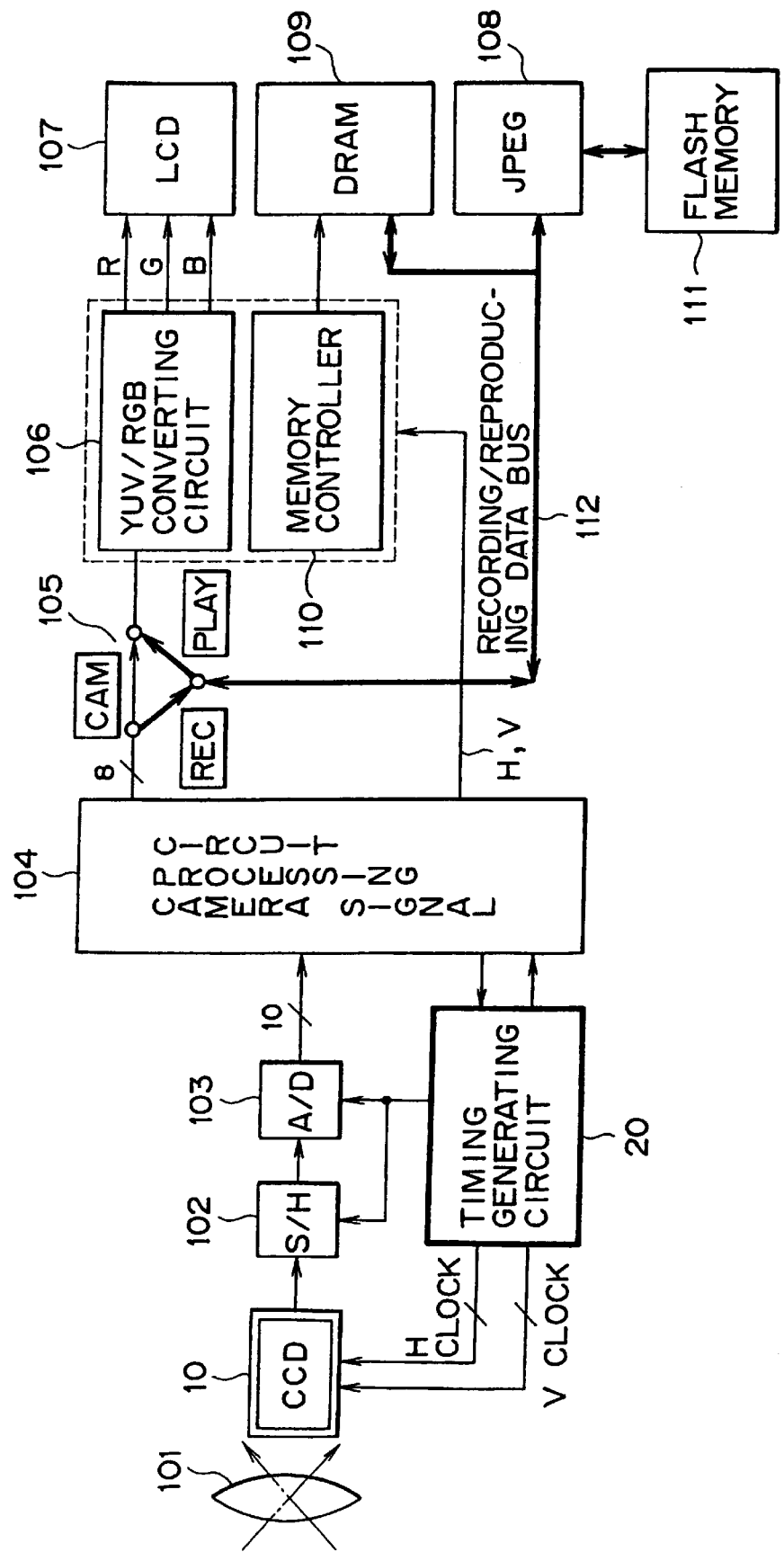
FIG. 7 is a schematic block diagram of a camera practiced as another embodiment of the invention.

What follows is a description of an electronic still camera utilizing as its image pickup device the CCD-equipped solid state image sensing apparatus of the above-described constitution. FIG. 7 is a schematic block diagram of an electronic still camera practiced as another embodiment of the invention.

As shown in FIG. 7, the electronic still camera comprises a CCD solid state image sensing device 10, a timing generating circuit 20, an optical lens 101, a sample-and-hold (S/H) circuit 102, an A/D converter 103, a camera signal processing circuit 104, a data switcher 105, a converting circuit 106, a liquid crystal display (called the LCD hereunder) 107, an encoder/decoder 108, a DRAM (dynamic random access memory) 109, a memory controller 110, and a flash memory 111.

The optical lens 101 first causes the CCD solid state image sensing device 10 to form a two-dimensional optical image of a subject. The devices 10 output voltage signals representing the image and processed successively by the S/H circuit 102, A/D converter 103 and camera signal processing circuit 104 as needed. Given a mode switching signal (CAM, Rec, Play) generated illustratively by a user's key operation, the data switcher 105 changes destinations to which to transmit so-called component signals (Y, Cr, Y, Y, Cb, Y) wherein brightness data and color difference data are multiplexed.

If the component signals are sent to the converting circuit 106 upon changeover by the data switcher 105, the converting circuit 106 converts the component signals to three primary color signals (R, G, B) for output to the LCD 107. The LCD 107 in turn displays the received signals as a visible image.

If the component signals are transmitted upon changeover by the data switcher 105 to the encoder/decoder 108 over a recording/reproducing data bus 112, the encoder/decoder 108 subjects the component signals to data compression through the coding of adaptive DCT (discrete cosine transform) recommended by the JPEG (Joint Photographic Experts Group). Any other highly efficient coding scheme differing from that of the JPEG may be adopted instead.

The DRAM 109 is provided for use in JPEG-based blocking and other processes. The DRAM 109 has its workings controlled by an address signal and control signals sent from the memory controller 110. When the encoder/decoder 108 performs the JPEG data compression, the compressed data are stored as picked-up image data into the flash memory 111. The flash memory 111 keeps its contents intact when power is turned off. Data may be electrically written to or deleted from the entire flash memory or a divided part of this semiconductor memory. Alternatively, a memory setup other than the flash memory 111 may be adopted as long as it is a nonvolatile memory.

In this electronic still camera embodying the invention, the optical lens 101 first forms a two-dimensional optical image of the subject. The solid state image sensing apparatus converts photoelectrically the image thus formed into electrical signals representing the image. The electrical signals are stored as picked-up image data into the flash memory 111. Upon storage of the picked-up image data into the flash memory 111, the LCD 107 displays as a visible image the electrical signals derived from the photoelectrical conversion in order to monitor the composition of the subject.

Figure 8:
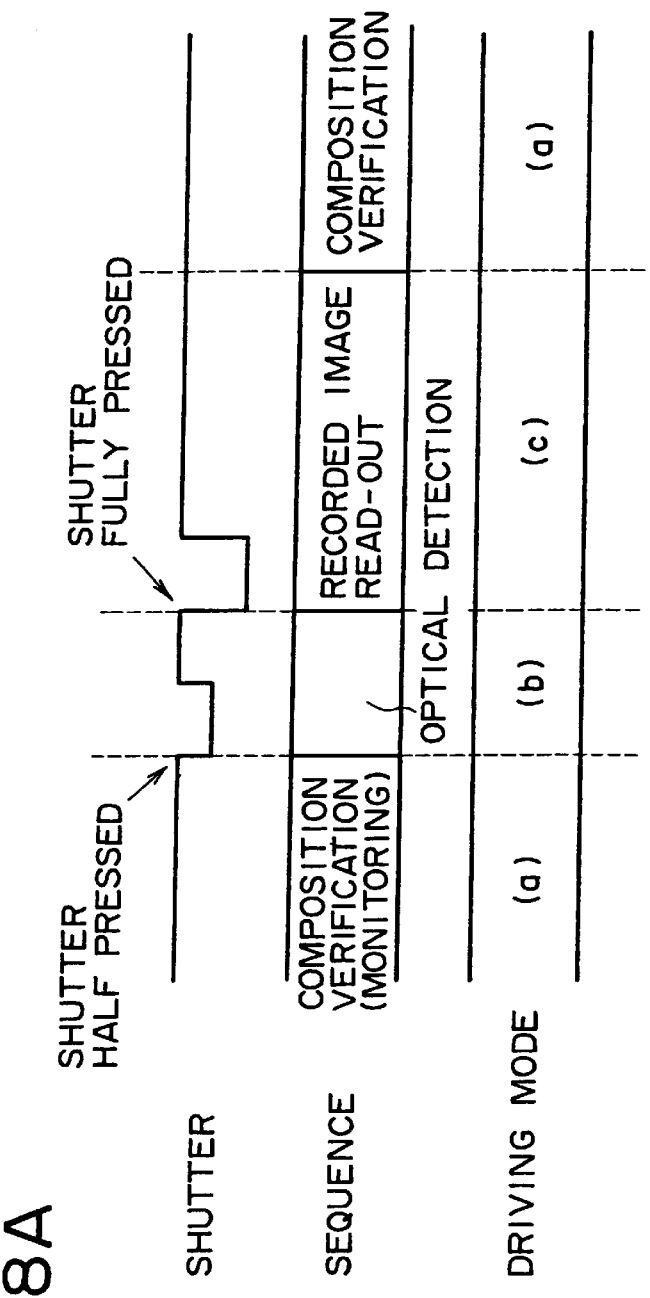
FIGS. 8A and 8B are explanatory views showing aspects of sequencing, FIG. 8A being a timing chart of the sequencing, FIG. 8B tabulating relations between operating modes and driving frequencies.
Figure 9:
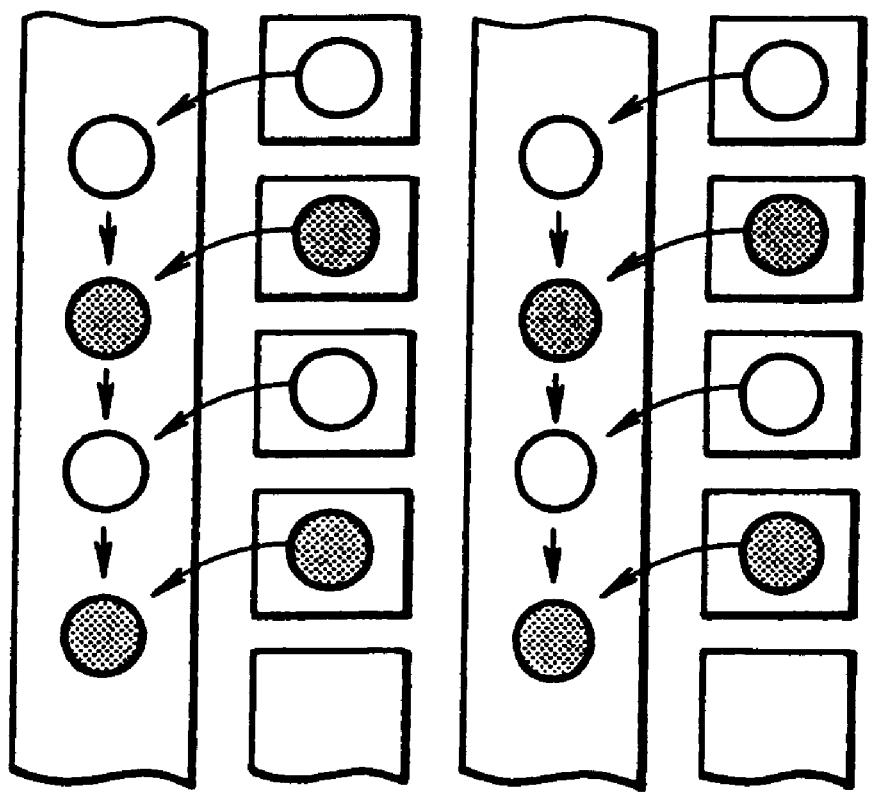
FIG. 9 is an explanatory view indicating how an all-pixel read-out method typically works.

Described with reference to FIG. 8 is how sequencing of the electronic still camera of the above constitution takes place while images of a subject are being picked up when picking up images of the subject, the electronic still camera first allows the user to monitor the composition of the subject that is viewed on the LCD 107.

At this point, the display screen on the LCD 107 is intended just for monitoring, i.e., for verifying the picture angle. There is little problem if the picture quality of the display suffer s slight deterioration. However, the motions of displayed images must remain smooth and natural. The period of time spent on the monitoring operation happens to be the longest of the sequences involved in picking up images of the subject.

With this electronic still camera, the driving mode for monitoring is referred to an "a" mode as shown in FIG. 8A. The "a" mode is a mode in which the driving frequency fed to the CCD solid state image sensing device 10 is reduced to 1/m of the original level with signal charges read out in the thinned read out mode (1/n) so that the frame rate remains constant (n/m). This makes it possible during monitoring to keep displayed image motions smooth and natural on the LCD 107, while the power dissipation of the CCD solid state image sensing device 10 is lowered.

After the composition of the subject has been verified following the monitoring, the electronic still camera has its shutter button half-pressed by the user as indicated in FIG. 8A. Optical detection is carried out so as to implement such functions as automatic focusing (AF), auto exposure (AE), auto white balance (AWB), and blurring detection. In such cases, it is necessary to acquire instantaneously signals representing a plurality of frames from the CCD solid state image sensing device 10.

At the time of optical detection, the electronic still camera operates in what is called a "b" driving mode. The "b" mode is a mode in which signal charges are read out in the thinned read-out mode (1/n) without dividing the driving frequency fed to the CCD solid state image sensing device 10 so that the frame rate is increased correspondingly (by a factor of n). This makes it possible at the time of optical detection to obtain signals necessary for AF, AE, AWB and blurring detection quickly and unfailingly. The signals acquired here are used only for the optics-oriented functions and are thus irrelevant to the quality of images.

With the optical detection stage completed, the electronic still camera prompts the user to fully press the shutter button to read out a picked-up image as indicated in FIG. 8A. The picked-up image data are stored into the flash memory 111. At this point, the best image quality is needed, which requires bringing a "c" driving mode into effect. The "c" mode is a mode in which the signal charges are read out in the all-pixel read-out mode (normal mode) and in which the driving frequency is not divided so as to forestall adverse effects of dark currents or smears. After storage of the picked-up image data is completed, the electronic still camera again returns to its monitoring state.

This electronic still camera is set beforehand to operate in the "a" mode for monitoring, in the "b" mode at the time of optical detection and in the "c" mode for data storage. A central processing unit (CPU), not shown, of the camera issues operating instructions to the timing generating circuit 20 and other relevant components in accordance with the mode settings and the shutter status currently in effect.

As described, the electronic still camera embodying the invention operates in the thinned read-out mode (1/n) upon monitoring for verification of the subject composition. At the same time, the embodiment reduces to 1/m the driving frequency supplied to the CCD solid state image sensing device 10. This lowers the power dissipation of the CCD solid state image sensing device 10 while averting a decline in the frame rate. That is, there can be a viable trade-off upon monitoring between an acceptable degree of recognition of moving pictures displayed on a monitor screen on the one hand and the need to lower power consumption on the other hand. Reductions in power dissipation during monitoring are particularly beneficial because the period of time spent on monitoring is the longest of the sequences involved in picking up images of the subject.

If n=m in the above example, there is no change in the frame rate. This facilitates signal processing by the S/H circuit 102, A/D converter 103 and camera signal processing circuit 104.

When storing picked-up image data, the electronic still camera of this invention operates in the all-pixel read-out mode and keeps the driving frequency undivided. This protects the quality of picked-up image data from deterioration upon data storage. Because the operating mode and the driving frequency are switched upon monitoring and at the time of picked-up image data storage, the inventive electronic still camera lowers its power dissipation through reductions in the amount of power consumed by the CCD solid state image sensing device 10 without adversely affecting the motions of images displayed on the LCD 107 or the quality of picked-up images.

Although the invention was shown applying to an electronic still camera that takes still pictures of objects, this is not limitative of the invention. Alternatively, the invention also applies to a video camera that picks up moving pictures. The benefits of the invention described above also apply when the driving frequency of a solid state image sensing device incorporated in the video camera is varied depending on the operating mode in effect.

As described, the solid state image sensing apparatus of the invention and the inventive method for driving the apparatus allow the driving frequency of the solid state image sensing device constituting the apparatus to vary depending on the operating mode in effect. This makes it possible illustratively to make the driving frequency in the thinned read-out mode lower than that in the all-pixel read-out mode, whereby the power dissipation of the solid state image sensing device is reduced while drops in the frame rate are averted. That is, the solid state image sensing apparatus can reduce its power dissipation without adversely affecting the number of pictures output by the solid state image sensing device per unit time.

The camera according to the invention allows the driving frequency of the incorporated solid state image sensing device to vary depending on the operating mode in effect. This makes it possible to switch the operating mode and the driving frequency upon verification of the composition of a subject and at the time of storing picked-up image data. The inventive camera is thus able to lower its power dissipation through reductions in the amount of power consumed by the incorporated solid state image sensing device without adversely affecting motions of displayed pictures upon monitoring or the quality of picked-up images.

As many apparently different embodiments of this invention may be made without departing from the spirit and scope thereof, it is to be understood that the invention is not limited to the specific embodiments thereof except as defined in the appended claims.

What is claimed is:

1. A solid state image sensing apparatus comprising:
   a solid state image sensing device operated selectively either in an all-pixel read-out mode in which signal charges of all pixels represented by the device are read therefrom individually at the same time upon occurrence of a readout pulse signal both in a first vertical transfer clock signal coupled to only a part of vertical pixel columns formed by the device and in a second vertical transfer clock signal coupled to a remainder of the vertical columns formed by the device, or in a thinned read-out mode in which the signal charges are read only from the part of the vertical pixel columns formed by the device which are coupled to the first vertical transfer clock signal upon occurrence of the readout pulse signal only in the first vertical transfer clock signal; and
   frequency varying means for varying a driving frequency of said solid state image sensing device depending on the operating mode in effect.

2. A solid state image sensing apparatus according to claim 1, wherein said frequency varying means includes:
   an oscillator for oscillating reference pulses of a predetermined frequency;
   a divider for dividing said reference pulses oscillated by said oscillator; and
   a selector for selecting either said reference pulses as oscillated by said oscillator, or a reference pulse signal obtained by said divider dividing said reference pulses to supply to said solid state image sensing device depending on the operating mode in effect.

3. A camera comprising:
   an optical lens for forming a two-dimensional optical image of a subject;
   a solid state image sensing apparatus for photoelectrically converting the image formed by said optical lens into electrical signals; storing means for storing said electrical signals obtained as picked-up image data through the photoelectric conversion by said solid state image sensing apparatus; and
   displaying means for displaying, upon storage of said picked-up image data into said storage means, said electrical signals in the form of a visible image for the purpose of verifying composition of said subject;
   wherein said solid state image sensing apparatus includes:
      a solid state image sensing device operated selectively either in an all-pixel read-out mode in which signal charges of all pixels represented by the device are read therefrom individually at the same time upon occurrence of a readout pulse signal both in a first vertical transfer clock signal coupled only to a part of vertical pixel columns formed by the device and in a second vertical transfer clock signal coupled to a remainder of the vertical columns formed by the device, or in a thinned read-out mode in which the signal charges are read only from the part of the vertical pixel columns formed by the device which are coupled to the first vertical transfer clock signal upon occurrence of the readout pulse signal only in the first vertical transfer clock signal; and
      frequency varying means for varying a driving frequency of said solid state image sensing device depending on the operating mode in effect.

4. A camera according to claim 3, wherein said solid state image sensing device is placed into said thinned read-out mode when said displaying means is used to verify the subject composition, and into said all-pixel read-out mode when said electrical signals are stored into said storing means; and wherein said frequency varying means makes the driving frequency in said thinned read-out mode lower than the driving frequency in said all-pixel read-out mode.

5. A method for driving a solid state image sensing apparatus having a solid state image sensing device operated selectively either in an all-pixel read-out mode in which signal charges of all pixels represented by the device are read therefrom individually at the same time upon occurrence of a readout pulse signal both in a first vertical transfer clock signal coupled to only a part of vertical pixel columns formed by the device and in a second vertical transfer clock signal coupled to a remainder of the vertical columns formed by the device, or in a thinned read-out mode in which the signal charges are read only from the part of the vertical pixel columns formed by the device which are coupled to the first vertical transfer clock signal upon occurrence of the readout pulse signal only in the first vertical transfer clock signal, said method comprising the step of:

making lower the driving frequency of said solid state image sensing device in said thinned read-out mode in which the signal charges are read partially from the device, than the driving frequency of said solid state image sensing device in said all-pixel read-out mode.

6. A solid state image sensing apparatus comprising:

a solid state image sensing device operated selectively either in an all-pixel read-out mode in which signal charges of all pixels represented by the device are read therefrom individually at the same time upon occurrence of a readout pulse signal both in a first vertical transfer clock signal coupled to only a part of vertical pixel columns formed by the device and in a second vertical transfer clock signal coupled to a remainder of the vertical columns formed by the device, or in a thinned read-out mode in which the signal charges are read only from the part of the vertical pixel columns formed by the device which are coupled to the first vertical transfer clock signal upon occurrence of the readout pulse signal only in the first vertical transfer clock signal; and frequency varying means for varying a driving frequency of said solid state image sensing device depending on the operating mode in effect, said solid state image sensing device operated selectively either in a first mode in which the solid state image sensing device is operated in the thinned read-out mode and the driving frequency is reduced from an original level, in a second mode in which the solid state image sensing device is operated in the thinned read-out mode and the driving frequency is the original level, or in a third mode in which the solid state image sensing device is operated in the all-pixel read-out mode and the driving frequency is the original level.

* * * * *